United States Patent
Ackland et al.

[11] Patent Number: 5,987,156
[45] Date of Patent: Nov. 16, 1999

[54] APPARATUS FOR CORRECTING FIXED COLUMN NOISE IN IMAGES ACQUIRED BY A FINGERPRINT SENSOR

[75] Inventors: Bryan David Ackland, Old Bridge, N.J.; Andrew John Blanksby, Daw Park, Australia

[73] Assignee: Lucent Technologies, Murray Hill, N.J.

[21] Appl. No.: 08/755,684

[22] Filed: Nov. 25, 1996

[51] Int. Cl.[6] .............................. G06K 9/28; G06K 9/40; G06K 9/46; G06K 9/60

[52] U.S. Cl. ...................... 382/125; 382/272; 382/274; 382/275; 382/319; 358/446; 358/463

[58] Field of Search .................................. 382/124, 125, 382/126, 127, 312, 315, 169, 172, 272, 274, 275, 254, 319; 356/71; 340/825.34; 348/77; 209/585; 358/483, 446, 463, 461; 377/62, 63; 178/20.02, 20.03, 18.06

[56] References Cited

U.S. PATENT DOCUMENTS

| | | | |
|---|---|---|---|
| 4,045,816 | 8/1977 | Cave | 382/275 |
| 4,807,038 | 2/1989 | Michon | 358/213.31 |
| 4,811,414 | 3/1989 | Fishbine et al. | 382/272 |
| 5,038,225 | 8/1991 | Maushima | 358/461 |
| 5,047,861 | 9/1991 | Houchin et al. | 358/213.15 |
| 5,065,444 | 11/1991 | Garber | 382/275 |
| 5,774,572 | 6/1998 | Caspi | 382/141 |
| 5,881,182 | 3/1999 | Fiete et al. | 382/275 |
| 5,892,590 | 4/1999 | Ida et al. | 358/406 |

OTHER PUBLICATIONS

Toshifumi Ozaki, Hajime Kinugasa, Takashi Nishida, A Low–Noise Line–Amplified MOS Imaging Devices, IEEE Publication, 1991, pp. 969–975, 1991.

*Primary Examiner*—Leo H. Boudreau
*Assistant Examiner*—Brian P. Werner
*Attorney, Agent, or Firm*—Frederick B. Luludis; Jeffery J. Brosemer

[57] ABSTRACT

A facility is provided for correcting fixed column noise that may appear in a fingerprint image acquired from a capacitive fingerprint sensor. In particular, corrective gain and offset values are determined for each column of pixel signals generated by the sensor and are applied to such signals to greatly diminish the fixed column noise that may be present in that column.

11 Claims, 4 Drawing Sheets

APPARATUS FOR CORRECTING FIXED COLUMN NOISE IN IMAGES ACQUIRED BY A FINGERPRINT SENSOR

FIELD OF THE INVENTION

The claimed invention relates to the field of electronically identifying a fingerprint pattern and the like, and more particularly relates to correcting for fixed column noise present in an electronically acquired fingerprint pattern.

BACKGROUND OF THE INVENTION

A fingerprint acquisition system acquires an image of a fingerprint that is in contact with an imaging sensor. Such a sensor could be, for example, a CMOS chip comprising, inter alia, a 2-D pixel array, in which each pixel includes a metal plate having a capacitance that changes when the tip of a finger is in close close proximity to the plate. The small ridges and valleys on the finger tip making contact with the surface of the CMOS chip form variations in capacitance across the chip that can be measured using a known current source to remove a fixed amount of charge from each capacitive plate over a predetermined interval of time. The resulting voltage (pixel signals) outputted by the sensor is then used to form an image of the fingerprint.

There are a number of different ways of outputting the values of the pixel signals from the 2-D pixel array. One way of outputting such pixel values is to read out each row of the array in turn starting from the first row using a so-called column-parallel architecture known in the art to access each row of elements 12. In such an architecture, each column requires its own read-out circuit, which allows each element 12 to be accessed at a line rate rather than at a higher pixel rate. In the ideal case, each column read-out circuit would be identical, i.e., matched. However, due to variations in the processes used to manufacture the fingerprint sensor, the column read-out circuits are not perfectly matched.

Disadvantageously, images produced by such a sensor suffer from fixed column noise, which introduces substantial spatial correlations into the image. This problem may confuse subsequent processing designed to extract relevant features for verification purposes.

SUMMARY OF THE INVENTION

We have recognized that the architecture of a CMOS fingerprint sensor chip may be described as having a series of independent linear pixel arrays each having a current source and read-out circuit. Although each of the column circuits have the same design, we have found that each column circuit, nevertheless, has unique gain and offset values due to variations in the uniformity of the CMOS processing. We have also recognized, however, that if such a sensor could be characterized in terms of such gains and offsets, then images produced by the sensor could be corrected by applying an appropriate corrective gain and offset to the pixel values outputted by each column circuit. The required corrective gain and offset may be determined for each column while acquiring a fingerprint image by exploiting the fact that many of the pixel values in each column correspond to either a ridge or valley.

DETAILED DESCRIPTION

The following describes an illustrative embodiment of the invention in the context of a particular CMOS chip. It should be understood, however, that describing the invention in the context of such a chip should not be construed as a limitation, since, as will be made clear from the following discussion, the invention may be readily employed with a number of different apparatus, e.g., CMOS chips having different architectures but designed to capture an image, such as a fingerprint.

Figure 1:
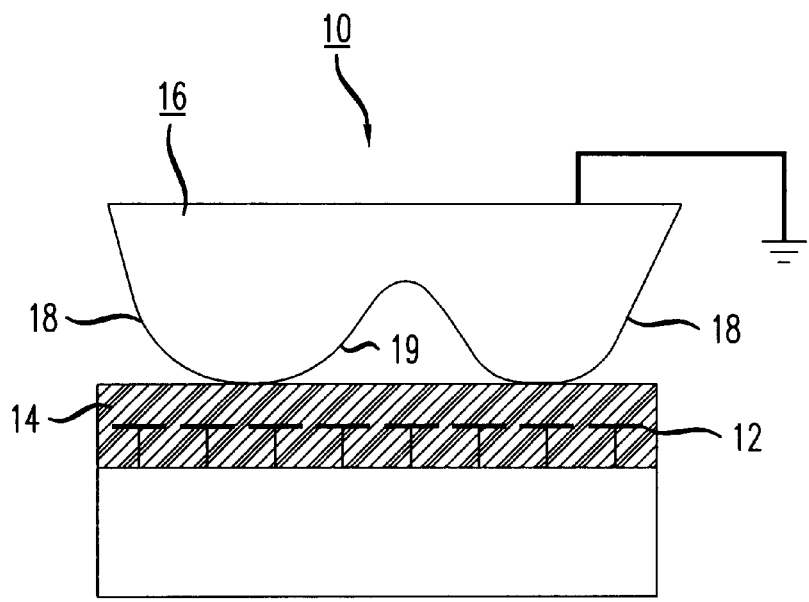
FIG. 1 shows a cross-sectional view of an array of sensing elements receiving two fingerprint ridges of a finger.

With that in mind, FIG. 1 shows topological sensor 10 that contains an array of sensing elements 12 each having dimensions smaller than the pattern of an image that is being acquired. For example, when used to acquire a fingerprint, then the dimensions of the sensing elements should be smaller than the ridges and valleys forming the fingerprint that is in contact with surface 14 of sensor 10. Since the surface of a finger is uneven, certain portions thereof (ridges 18) make physical contact with surface 14 while other portions (valleys 19) will be spaced apart from the sensing surface 14. Each sensing element 12 forms a capacitor with that portion of the finger (or pattern) located directly above the element. The sensing elements 12 thus form one set of electrodes or plates for the capacitors.

As is well-known, the capacitance of a capacitor may be defined as follows:

$$C = k(A/d) \qquad (1)$$

where C is the capacitance, k is a dielectric constant, A is the surface area of capacitor and d is the distance between the electrodes. It is known that a capacitor stores a charge Q that may be determined by the following expression:

$$Q = CV \qquad (2)$$

where Q is the stored charge and V is the voltage applied across the electrode.

From (1) it is clear that the value of C is inversely proportional to the distance between the electrodes. As such, the capacitance of a capacitor formed between a sensing element 12 and a valley 19 of the finger making contact with surface 14 will be less than the capacitance of a capacitor formed between a sensing element 12 and a ridge of the finger. Thus, the capacitors formed between the sensing elements 12 and regions of the finger intermediate to the ridges and valleys will have capacitances between the limits defined by the ridges and valleys.

Figure 2:
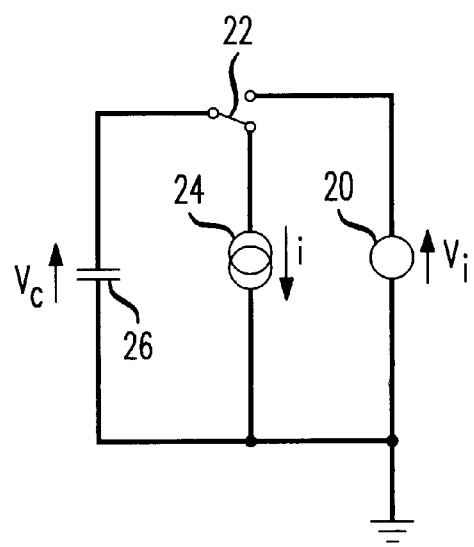
FIG. 2 is an example of a circuit that may be used to measure the capacitance of the capacitors formed by the sensing elements of the finger shown in FIG. 1.

One example of a circuit that may be employed to measure the capacitance of such capacitors is shown in FIG. 2. When a finger is placed on sensing surface 14 and the capacitors are brought to a known potential $V_i$ by connecting the array of sensing elements to a voltage source 20 via a switch 22, a particular capacitor 26 having capacitance C would contain a charge $q_i = CV_i$. With the finger still making contact with sensing surface 14, the array of sensing elements are disconnected from the voltage source 20 and connected to a current source 24 via switch 22. The connection between the sensing elements 12 and the current source 24 is maintained for a fixed period of time t. The amount of charge drained from a given capacitor is $q_k = it$, where i is the current generated by the current source 24. At the end of time period t the potential of the sensing element 12 can be measured to obtain a value $V_f$. The capacitance of capacitor 26 can now be calculated from the relationship q=CV, where q is the charge $q_k$ drained from the capacitor and V is the difference between the initial potential $V_i$ and final potential $V_f$ across the electrodes. The capacitance of the capacitor 26 is thus given by the expression $$C = q_k / (V_i - V_f) \tag{3}$$

By measuring the capacitances of the array of capacitors it is possible to calculate from equation (1) the distance d between each sensing element 12 and the portion of the finger located thereabove. However, to obtain an image of the topography of the finger making contact with surface 14, it is not necessary to calculate these distances. All that is required to obtain such an image is to determine the relative magnitude of the capacitances as they are distributed over the sensor array.

It is understood of course that each of the sensing elements has a parasitic capacitance with respect to other elements in the device. To detect the presence of a ridge, for example, the change in the capacitance of the sensing element due to the presence of the ridge must be sufficiently large so that it is measurable with respect to the parasitic capacitance.

In one particular embodiment sensor 10 is fabricated by a conventional CMOS process and the sensing elements are spaced apart from one another by approximately 50 microns to achieve a resolution of 300–500 dpi. The parasitic capacitance of the sensing elements without a finger in contact with sensing surface 14 is approximately 180 fF. When a finger tip touches the sensing surface then the capacitance of the sensing elements 12 contacting the finger increases to approximately 350 fF under typical environmental conditions.

Figure 3:
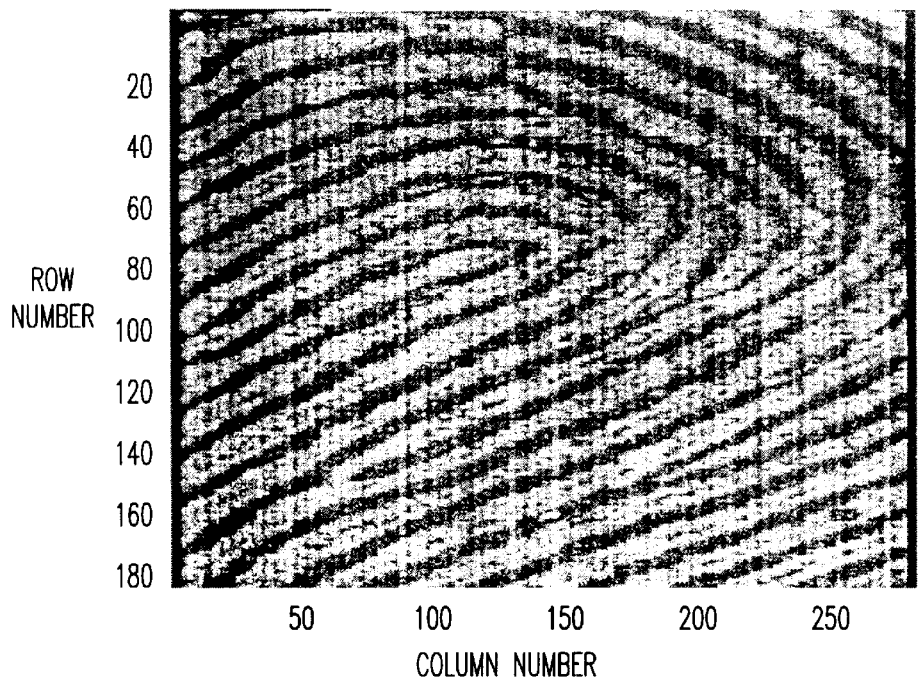
FIG. 3 illustrates the way in which fixed pattern noise is present in an image acquired by a fingerprint acquisition sensor of the type illustrated in FIG. 4.

As mentioned above, images produced by such a sensor suffer from fixed column noise, which introduces substantial spatial correlations into the image, and which may confuse subsequent processing designed to extract relevant features for verification purposes. The way in which such column noise affects the clarity of an acquired image is shown in FIG. 3.

Figure 4:
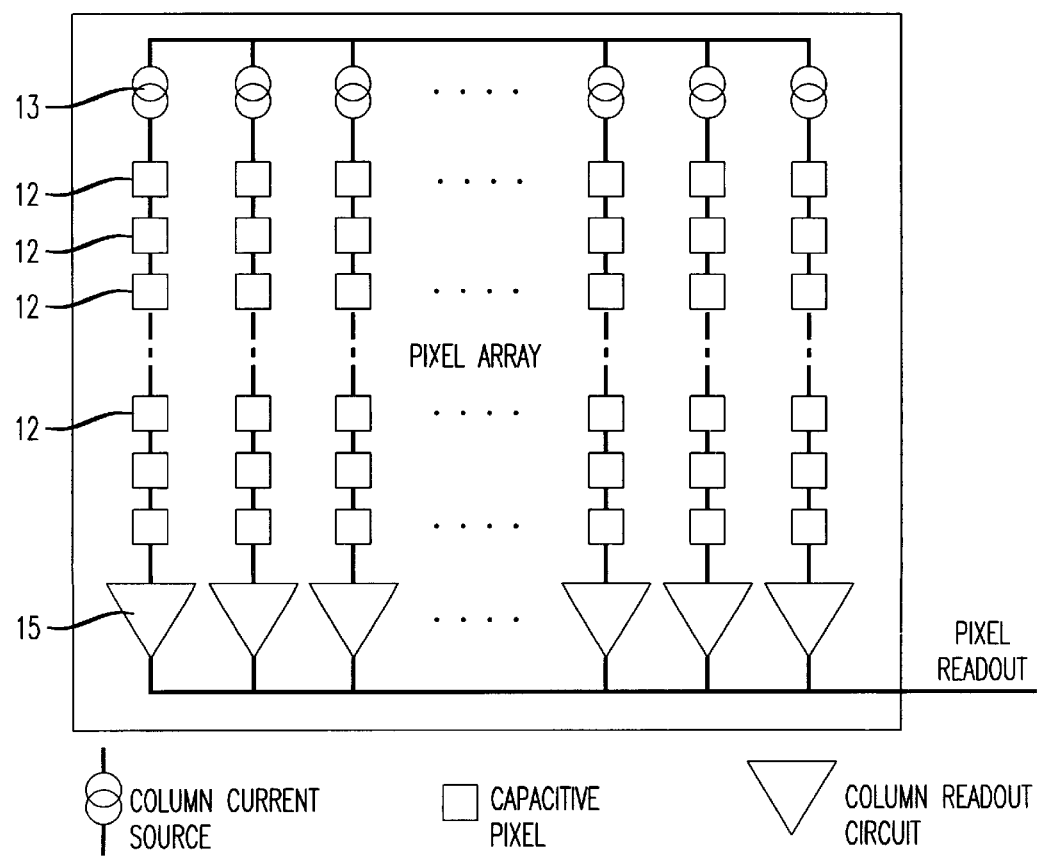
FIG. 4 shows in broad block diagram form the architecture of a CMOS fingerprint sensor.

To deal with this problem, we have recognized that we could exploit a simple model of fingerprint sensing 10 and also exploit a simple model of fingerprint images in a technique for eliminating the effect of the aforementioned fixed column noise. A simple model of a CMOS sensor array may be characterized as a series of independent sensing elements 12 arranged into columns as shown in FIG. 4. Each column includes a current reference 13 which supplies a control signal to set the output of each current source 24 within each sensor element 12 that is associated with the column. Each column also contains an amplifier 15 which is used to amplify the output of the particular sensing element 12 within the column that is associated with the row to be read. Examples of sources of fixed column noise that might arise with this arrangement are variations between column current references 13 and variations in the offset and gains of the column amplifiers 15. These can result from variations in the uniformity of processing/manufacturing of the CMOS chip. As a result of these column variations, each column has its own unique values of signal gain and offset.

Figure 7:
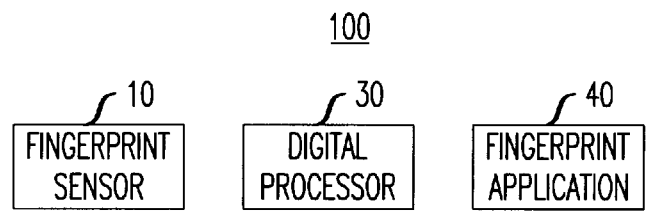
FIG. 7 shows in block diagram form a system in which the principles of the invention may be practiced.
Figure 8:
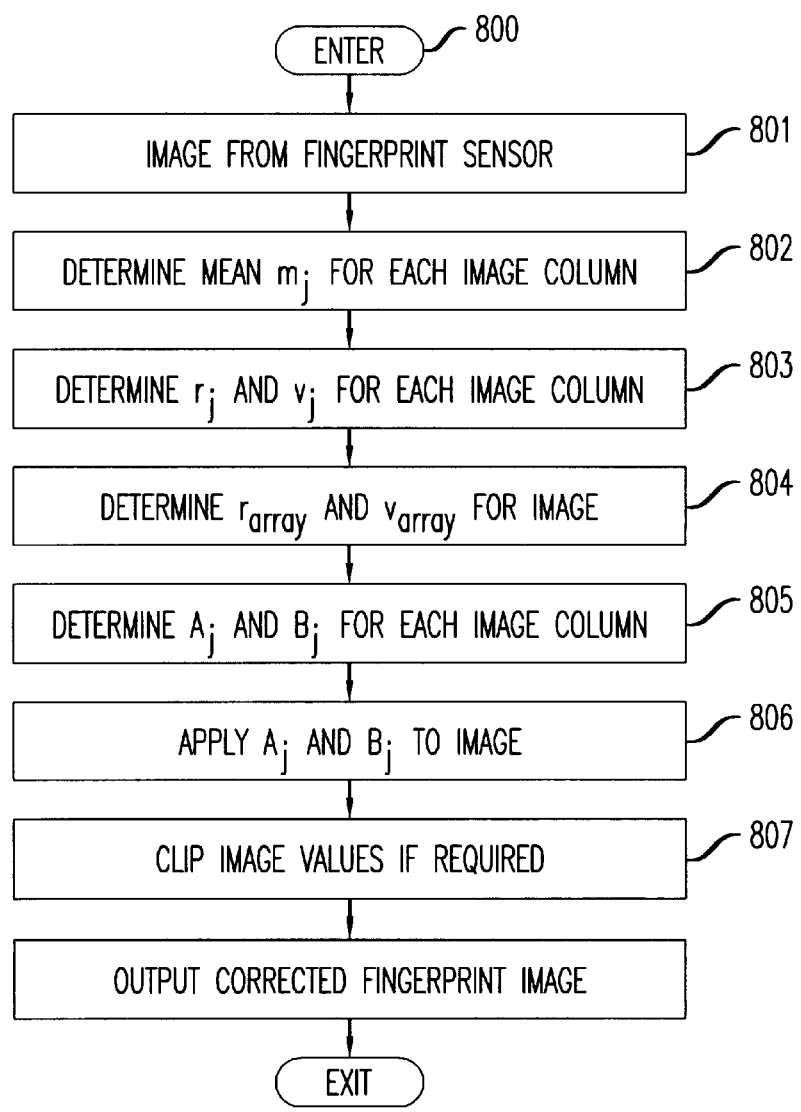
FIG. 8 shown in flow chart form the software program which implements the invention in the digital processor of FIG. 7.

(It is noted that the following discussion will make reference to FIG. 8, which is a flow chart of a program which implements the invention in the digital processor of FIG. 7.)

Figure 5:
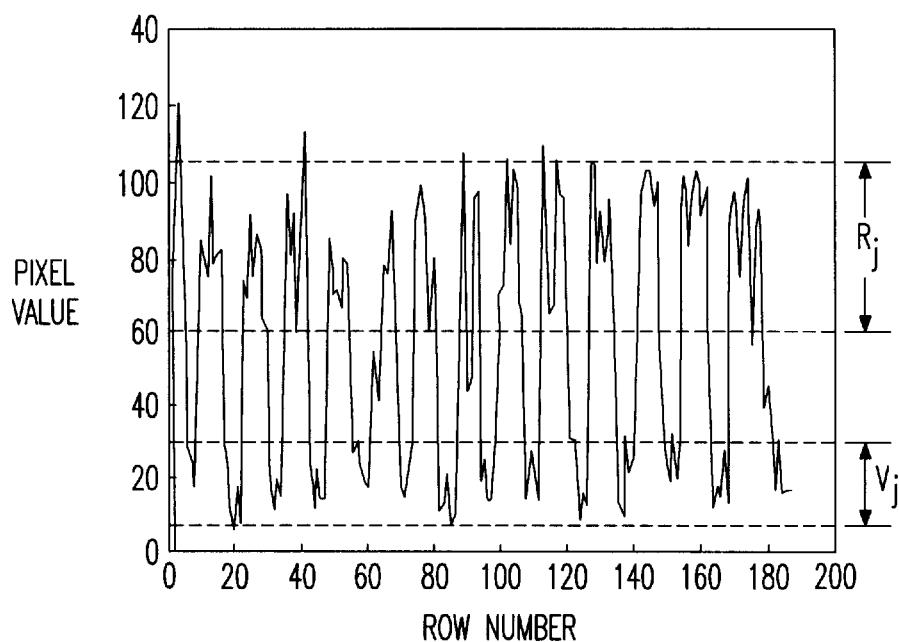
FIG. 5 shows the pixel values along column 50 of the circuit arrangement of FIG. 4, in which the peak and trough pixel values respectively correspond to ridges valleys in the fingerprint.

Specifically, the dominant features of a fingerprint image acquired (block 801) by CMOS sensor 10 are the ridges and the valleys, as is shown in FIG. 5 which is a plot of the values of the pixel signals outputted by respective elements 12 forming a particular column, e.g., column 50. The positions (rows) of elements 12 are plotted along the x-axis. It is seen from FIG. 5 that the values of such pixel signals are mostly confined to one of two ranges of values, i.e., a range $R_j$ and range $V_j$, respectively corresponding to ridges and valleys in column j, e.g., column 50. Such ranges would be different for different columns of elements 12. We have recognized that if two pixel values $r_j$ and $v_j$ respectively characterizing ranges $R_j$ and $V_j$ can be determined for column j, then such values may be used as elements in the derivation of the corrective gain $A_j$ and off-set value $B_j$ required for that column. In accordance with an aspect of the invention, the values of $r_j$ and $v_j$ may be found (block 802) by first determining the mean pixel value $m_j$ for each column (also referred to hereinafter as the "column mean value"). The value of $r_j$ is then determined (block 803) by finding the average value of the pixels in column j having values greater than $m_j$. The value of $v_j$ is determined (block 803) by finding the average pixel value of the pixels signals in column j having values less than $m_j$.

The other elements needed to complete the aforementioned derivation, $r_{array}$ and $v_{array}$, represent the values of pixel signals defining the ridges and valleys for all columns j in the corrected image. The values for $r_{array}$ and $v_{array}$ may be determined (block 804) in a number of different ways based on the application that will use corrected image. For example, $r_{array}$ may be the mean value of all values of $r_j$ and $v_{array}$ may be the mean value of all values of $v_j$ for one particular application. Alternatively, $r_{array}$ may be set to the desired maximum pixel value in the corrected image and $v_{array}$ may be set to the desired minimum pixel value in the corrected image for another particular application.

The derivation for determining $A_j$ and $B_j$ (block 805) for each column j may be expressed as follows:

$$r_{array} = A_j \times r_j + B_j \tag{4}$$

$$v_{array} = A_j \times v_j + B_j \tag{5}$$

$A_j$ and $B_j$ may be readily found by simultaneously solving equations 4 and 5. Once the values for $A_j$ and $B_j$ have been determined in such a manner, then (block 806) the values may be applied to all pixel values, $pv_{ij}$, in a respective row i and column j in the following manner to generate a corrected pixel value $pv\_c_{ij}$:

$$pv\_c_{ij} = A_j \times pv_{ij} + B_j \tag{6}$$

In some applications of the foregoing, It may be necessary to ensure that the corrected pixel levels are within an allowable range of pixel values for the corrected image and "clip" them (block 807) at the maximum and minimum values if they are outside that range.

FIG. 7 illustrates a system in which the principles of the invention may be practiced. In particular, system 100 includes fingerprint sensor 10 discussed above, digital processor 30 and fingerprint application 40. Digital processor 30, more particularly, reads a fingerprint image out of fingerprint sensor 10 and processes the image in accordance with the program of FIG. 8 (discussed above). Processor 30 then outputs the processed result to fingerprint application 40, which may be, for example, a fingerprint verification/recognition system or the like.

Figure 6:
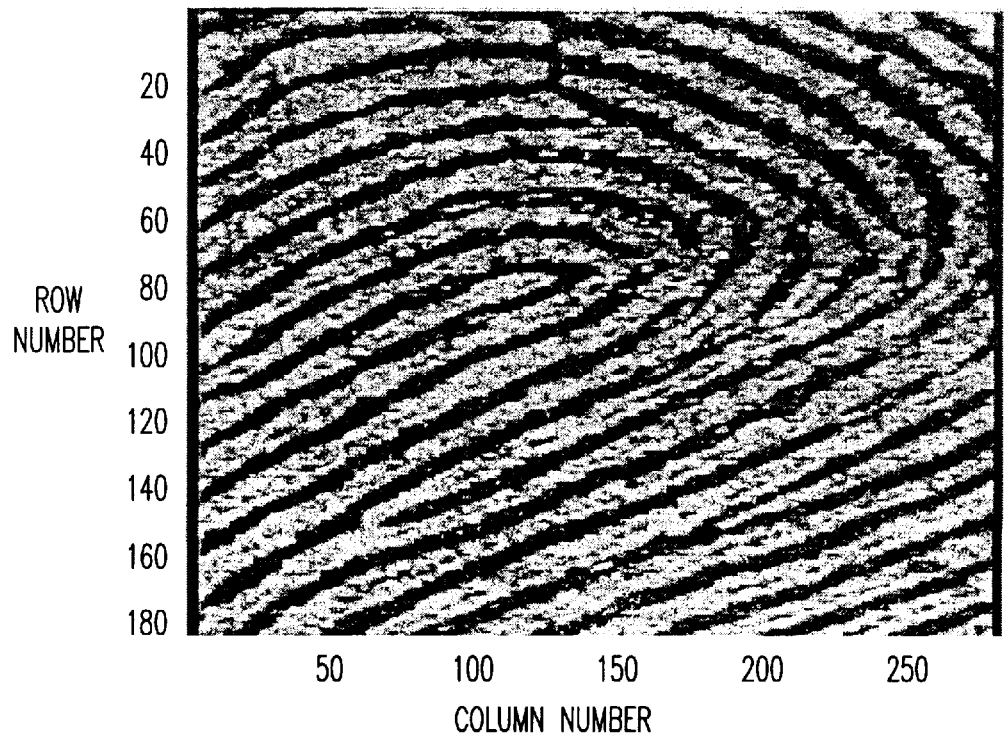
FIG. 6 shows a corrected version of FIG. 3, in which the correction is done in accordance with the principles of the invention.

FIG. 6 illustrates one example of the way in which the fingerprint pattern of FIG. 3 may be corrected in accordance with the principles of the invention. For this example, $r_{array}$ was determined as the mean value of $r_j$ and $v_{array}$ was determined as the mean value of $v_j$ for all values of j.

The foregoing is merely illustrative of the principles of the invention. Those skilled in the art will be able to devise numerous arrangements, which, although not explicitly shown or described herein, nevertheless embody those principles that are within the spirit and scope of the invention. For example, the values for the representative ridge and valley pixel values, $r_j$ and $v_j$, may also be respectively determined by forming the mean of the pixel values in each column that are greater than a first threshold value and by forming the mean of the pixel values in each column that are less than a second threshold value. The first and second threshold values may be determined from the image pixel values in a number of different ways, e.g., as a sum of the column mean value $m_j$ and a predetermined percentage of the range of pixel values in the inputted image.

We claim:

1. Apparatus for processing an image of an object acquired from a sensor, said sensor comprising an array of sensing elements, said sensing elements outputting respective pixel signals defining said object image, each of said pixel signals comprising a pixel value that can be associated with one of two types of dominant features in the object image, said apparatus comprising means for receiving the pixel signals generated by the sensing elements in response to the object image, said sensor including column circuits for reading out the pixel signals from a respective column of sensing elements, means responsive to the pixel signals for determining a first plurality of parameters characterizing the array and each of the column circuits, the first plurality of parameters including an average value for all pixels in the array having pixel values associated with the first dominant feature type, an average value for all pixels in the array having pixel values associated with the second dominant feature type, an average value in each column of pixels for pixels having pixel values associated with the first dominant feature type, and an average value in each column of pixels for pixels having pixel values associated with the second dominant feature type, means responsive to the first plurality of parameters for determining corrective gain and offset values associated with each of the column circuits, and means for correcting particular noise associated with the output of each of said columns as a function of the corrective gain and offset values characterizing each column.

2. Apparatus for processing an image of an object acquired from a sensor, said sensor comprising an array of sensing elements, said sensing elements outputting respective pixel signals defining said image, said apparatus comprising means for receiving the pixel signals from the sensing elements, said sensor including column circuits for reading out the pixel signals from a respective column of sensing elements, means responsive to the pixel signals for determining a plurality of parameters characterizing the array and each of the column circuits, and means for correcting particular noise associated with the output of each of said columns as a function of the plurality of parameters characterizing each column, wherein said image is a fingerprint and said means for determining said plurality of said parameters includes means for determining first and second pixel values characterizing ranges of pixel values respectively corresponding to ridges and valleys forming the entire fingerprint image acquired by the sensor.

3. The apparatus of claim 2 wherein said means for determining said first and second pixel values includes means for determining said first and second pixel values as a function of third and fourth pixel values determined for each array column and which characterize respective ranges of pixel values respectively corresponding to ridges and valleys forming that column of the fingerprint image acquired by the sensor.

4. The apparatus of claim 3 wherein said third and fourth pixel values are determined for each array column as a function of the pixel values obtained from that column of the array.

5. The apparatus of claim 4 wherein the function for determining the third value is the mean value of the pixel values for each column that are greater than a first threshold value and the function for determining the fourth value is the mean value of the pixel values for each column that are less than a second threshold value.

6. The apparatus of claim 5 wherein the first and second threshold values are determined as a function of the image pixel values.

7. The apparatus of claim 6 wherein the first threshold value is determined as a sum of the respective column mean value, $m_j$, and a predetermined percentage of the range of image pixel values and wherein the second threshold value is as the difference between the respective column mean value, $m_j$, and said predetermined percentage of the range of image pixel values.

8. The apparatus of claim 5 wherein said plurality of parameters include corrective gain and offset values that are derived as a function of the first and second pixel values and the third and fourth pixel values.

9. The apparatus of claim 3 wherein said means for determining the first pixel value includes means for determining the first pixel value as the mean of all of said third pixel values and for determining the second pixel value as mean of all of said fourth pixel values.

10. The apparatus of claim 3 wherein said parameters for each of said columns are determined as a function of the respective first, second, third and fourth pixel values.

11. An image processing system comprising an image sensor having an array of image sensing elements, means for receiving pixel signals from successive columns of the sensing elements forming the array, in which the values of the pixels signal from all said columns characterize an image that is being sensed by said sensing elements, means for determining a column mean value, $m_j$ for each column of pixel values, means for determining first, $r_j$, and second, $v_j$, pixel values for each column j as a function of the column mean value, $m_j$, and the pixel values received from respective column j, means for determining third, $r_{array}$, and fourth, $v_{array}$, pixel values as function of the first and second pixel values, means for determining corrective gain, $A_j$, and offset, $B_j$, values for each column as a function of the first, second, third and fourth pixel values, and means for applying the corrective gain and offset values to the signal outputted from the respective column of the array.

* * * * *